US008467792B2

(12) United States Patent
Flore et al.

(10) Patent No.: US 8,467,792 B2
(45) Date of Patent: Jun. 18, 2013

(54) METHOD AND APPARATUS FOR MAINTAINING CALL CONTINUITY IN WIRELESS COMMUNICATION

(75) Inventors: Oronzo Flore, San Diego, CA (US); Francesco Grilli, La Jolla, CA (US); Kirti Gupta, San Diego, CA (US); Arungundram C. Mahendran, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1158 days.

(21) Appl. No.: 11/768,091

(22) Filed: Jun. 25, 2007

(65) Prior Publication Data

US 2008/0026752 A1     Jan. 31, 2008

Related U.S. Application Data

(60) Provisional application No. 60/817,216, filed on Jun. 27, 2006.

(51) Int. Cl.
*H04W 36/00* (2009.01)
(52) U.S. Cl.
USPC ........... 455/439; 370/331; 370/338; 370/353; 370/354; 370/356; 455/420; 455/436; 455/435.2; 455/444; 455/434
(58) Field of Classification Search
USPC ..... 455/435.2, 437–438, 432.1, 414.1–414.2, 455/432.2, 456.3, 456.1, 420, 434, 433, 439, 455/444, 448, 452.2, 525, 63.3; 370/329, 370/232, 235, 245, 310.2, 322, 328, 338, 370/332, 331, 348, 352–356, 445
See application file for complete search history.

(56) References Cited

U.S. PATENT DOCUMENTS 7,778,641 B1 * 8/2010 Willars et al. ................. 455/436
2004/0125923 A1 7/2004 See et al.
(Continued)

FOREIGN PATENT DOCUMENTS

EP       1328133 A2    7/2003
JP    2002314683 A    10/2002
(Continued)

OTHER PUBLICATIONS

International Search Report—PCT/US07/072278—International Search Authority, European Patent Office, May 26, 2008.

(Continued)

*Primary Examiner* — Vladimir Magloire
*Assistant Examiner* — Babar Sarwar
(74) *Attorney, Agent, or Firm* — S. Hossain Beladi (57) ABSTRACT

Techniques for performing handover in order to maintain call continuity for a user equipment (UE) are described. The UE may communicate with a first cell in a radio access network (RAN) for a packet-switched (PS) call, e.g., for Voice-over-Internet Protocol (VoIP) via High-Speed Packet Access (HSPA) in W-CDMA. The UE may send measurement reports to the RAN and may receive trigger from the RAN. The UE may establish a circuit-switched (CS) call with the first cell while the PS call is pending at the first cell. The PS call and the CS call may be for a voice call, and the UE may switch data path for the voice call from the PS call to the CS call and then terminate the PS call. The UE may then perform handover of the CS call from the first cell to a second cell, which may not support VoIP.

32 Claims, 10 Drawing Sheets

U.S. PATENT DOCUMENTS

| | | | |
|---|---|---|---|
| 2005/0049000 A1 | 3/2005 | Sheynman et al. | |
| 2005/0096024 A1 | 5/2005 | Bicker et al. | |
| 2005/0136973 A1 | 6/2005 | Llamas et al. | |
| 2005/0233753 A1* | 10/2005 | Hamabe et al. | 455/452.1 |
| 2005/0243870 A1 | 11/2005 | Balogh et al. | |
| 2005/0262222 A1 | 11/2005 | Neuhaus et al. | |
| 2006/0047840 A1 | 3/2006 | Postmus | |
| 2006/0121935 A1 | 6/2006 | Dalsgaard | |
| 2006/0270411 A1* | 11/2006 | Grayson | 455/444 |
| 2007/0014281 A1* | 1/2007 | Kant | 370/352 |
| 2007/0189255 A1* | 8/2007 | Navali et al. | 370/338 |

FOREIGN PATENT DOCUMENTS

| | | | |
|---|---|---|---|
| JP | 2002534874 T | | 10/2002 |
| JP | 2002534925 A | | 10/2002 |
| JP | 2003348137 A | | 12/2003 |
| JP | 2008521296 T | | 6/2008 |
| RU | 2237381 | | 9/2004 |
| TW | 477132 | | 2/2002 |
| WO | WO 0040053 | * | 6/2000 |
| WO | 0040053 | | 7/2000 |
| WO | WO0041408 A2 | | 7/2000 |
| WO | WO0191370 A2 | | 11/2001 |
| WO | 2006048697 | | 5/2006 |
| WO | WO2006057924 A2 | | 6/2006 |

OTHER PUBLICATIONS

"3rd Generation Partnership Project; Technical Specification Group Services and System Aspects; General Packet Radio Service (GPRS); Service description; Stage 2 (Release 6)," 3GPP TS 23.060 v6.13.0 (Jun. 2006).

"3rd Generation Partnership Project; Technical Specification Group Services and Systems Aspects; Network architecture (Release 7)," 3GPP TS 23.002 v7.1.0 (Mar. 2006).

"3rd Generation Partnership Project; Technical Specification Group Services and System Aspects; Voice Call Continuity (VCC) between Circuit Switched (CS) and IP Multimedia Subsystem (IMS); Stage 2 (Release 7)," 3GPP TS 23.206 v7.2.0 (Mar. 2007).

3GPP TS 23.206 V1.0.0 (May 2006), "Technical Specification 3rd Generation Partnership Project; Technical Specification Group Services and System Aspects; Voice Call Continuity between CS and IMS; Stage 2 (Release 7)", May 2006, XP002464999. (pp. 1-30).

Written Opinion of the International Searching Authority, PCT/US07/072278, European Patent Office, May 26, 2008.

Taiwan Search Report—TW096123295—TIPO—Mar. 21, 2011.

* cited by examiner

METHOD AND APPARATUS FOR MAINTAINING CALL CONTINUITY IN WIRELESS COMMUNICATION

I. CLAIM OF PRIORITY UNDER 35 U.S.C. §119

The present application for patent claims priority to Provisional Application Ser. No. 60/817,216, entitled "SINGLE RADIO VOICE CALL CONTINUITY," filed Jun. 27, 2006, assigned to the assignee hereof, and expressly incorporated herein by reference.

BACKGROUND

I. Field

The present disclosure relates generally to communication, and more specifically to techniques for maintaining call continuity in wireless communication.

II. Background

Wireless communication networks are widely deployed to provide various communication services such as voice, video, packet data, messaging, broadcast, etc. These networks may be multiple-access networks capable of supporting communication for multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A CDMA network may implement a radio access technology (RAT) such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). These various RATs and standards are known in the art. UTRA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

Different RATs typically have different capabilities, and different releases of a given RAT may also have different capabilities. For example, GSM is a second-generation (2G) RAT that supports voice and low rate data services. W-CDMA is a third-generation (3G) RAT that supports concurrent voice and data services, higher data rates, and other enhanced features. Each RAT may support circuit-switched (CS) and/or packet-switched (PS) calls. Circuit-switched refers to transfer of data for a user via dedicated resources (e.g., a dedicated traffic channel) assigned to the user. Packet-switched refers to transfer of data for a user via common resources (e.g., a shared traffic channel) that may be shared by multiple users.

A user equipment (UE) may be capable of communicating with wireless networks of different RATs such as W-CDMA and GSM. This capability may allow a user to obtain the performance advantages of W-CDMA and the coverage benefits of GSM with the same UE. The UE may have a voice call with one wireless network and may roam throughout the network or to another wireless network. It is desirable for the UE to maintain the voice call even as the user roams about.

There is therefore a need in the art for techniques to maintain call continuity in wireless communication.

SUMMARY

Techniques for performing packet-switched to circuit-switched (PS-to-CS) handover and circuit-switched to packet-switched (CS-to-PS) handover in order to maintain call continuity for a UE are described herein. In one design of PS-to-CS handover, the UE may communicate with a first cell in a radio access network (RAN) for a PS call, e.g., for Voice-over-Internet Protocol (VoIP) via High-Speed Packet Access (HSPA) in W-CDMA. The UE may send measurement reports to the RAN and may receive a trigger from the RAN. In response to the trigger, the UE may establish a CS call with the first cell while the PS call is pending at the first cell. The UE or the network may then terminate the PS call after establishing the CS call. The PS call and the CS call may be for a voice call, and the UE or the network may switch data path for the voice call from the PS call to the CS call after establishing the CS call and prior to terminating the PS call. The UE may then perform handover of the CS call from the first cell to a second cell. The first cell may be a W-CDMA cell that supports VoIP, and the second cell may be another W-CDMA cell or a GSM cell that does not support VoIP.

In another aspect, a UE may receive broadcast information from a cell indicating whether the cell has VoIP capability. The UE may update registration with a network based on the broadcast information. The UE may register with the network to receive calls in the PS domain if the cell has VoIP capability and may register with the network to receive calls in the CS domain if the cell does not have VoIP capability. The UE may update registration while it is in an idle mode so that pages and calls can be properly delivered to the UE.

Various aspects and features of the disclosure are described in further detail below.

BRIEF DESCRIPTION OF THE DRAWINGS

FIG. 9 shows a block diagram of a UE and some network entities in FIG. 1.

DETAILED DESCRIPTION

The handover techniques described herein may be used for various wireless communication networks such as CDMA, TDMA, FDMA, OFDMA, and SC-FDMA networks. The terms "network" and "system" are often used interchangeably. For clarity, the techniques are specifically described below for 3GPP-based networks.

Figure 1:
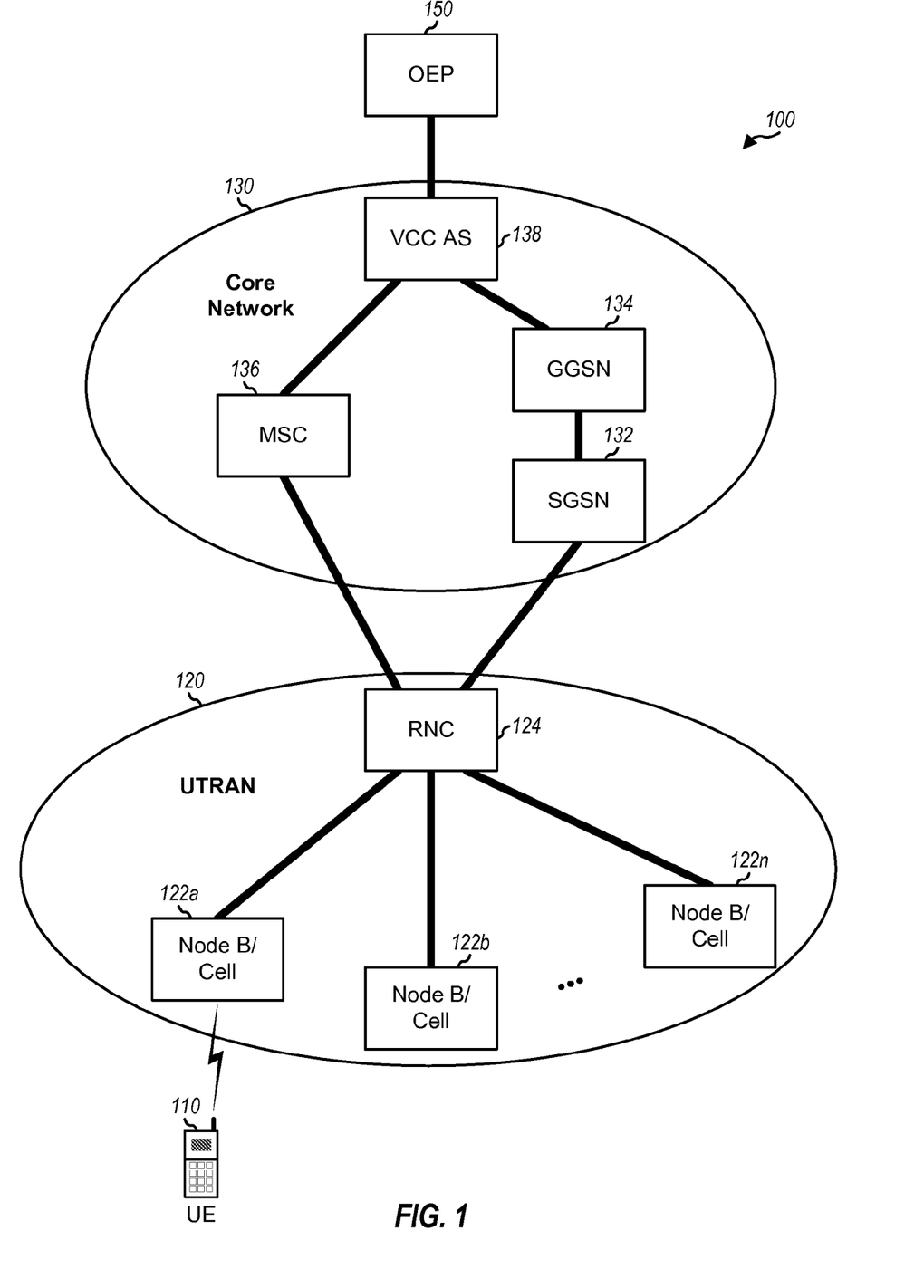
FIG. 1 shows a deployment of a RAN and a core network.

FIG. 1 shows an example deployment 100 of a Universal Terrestrial Radio Access Network (UTRAN) 120 and a core network 130 that support communication for UEs. For simplicity, only one UE 110 is shown in FIG. 1. UE 110 may also be referred to as a mobile station, an access terminal, a subscriber unit, a station, etc. UE 110 may be a cellular phone, a personal digital assistant (PDA), a wireless device, a wireless modem, a handheld device, a laptop computer, etc.

UTRAN 120 includes Node Bs coupled to Radio Network Controllers (RNCs). For simplicity, only three Node Bs 122a, 122b, and 122n are shown coupled to a single RNC 124 in FIG. 1. In general, UTRAN 120 may include any number of Node Bs and any number of RNCs. Each RNC may couple to a respective set of Node Bs and possibly to one or more other RNCs. A Node B may also be referred to as an evolved Node B (eNode B), a base station, an access point, etc. Each Node B supports radio communication for the UEs within its coverage area. As used herein, a "cell" can refer to the smallest unit of coverage in a wireless network and/or a Node B responsible for this coverage area, depending on the context in which the term is used. The terms "cell" and "Node B" are used interchangeably in the description below. RNC 124 provides coordination and control for Node Bs 122. For example, RNC 124 performs radio resource management, some mobility management functions, and other functions to support communication between UEs and UTRAN 120.

Core network 130 includes a Serving General Packet Radio Service (GPRS) Support Node (SGSN) 132, a Gateway GPRS Support Node (GGSN) 134, a Mobile Switching Center (MSC) 136, and a Voice Call Continuity Application Server (VCC AS) 138 that can anchor CS and PS calls. SGSN 132 facilitates exchanges of data packets between UTRAN 120 and GGSN 134 and performs mobility management for UEs with PS calls. SGSN 132 interfaces with RNC 124 in UTRAN 120 and supports PS services for UEs communicating with the UTRAN. GGSN 134 performs routing function and exchanges data packets with external data networks. MSC 136 supports CS services (e.g., for voice) and performs mobility management for UEs with CS calls. VCC AS 138 supports voice call continuity for UEs and provides capabilities to transfer voice calls between CS domain and IP Multimedia Subsystem (IMS), which utilizes PS domain. IMS is an architectural framework for delivering IP multimedia services to users. All voice calls for UE 110, which may be CS calls and/or PS calls, may be anchored in VCC AS 138. VCC AS 138 may perform functions to handover a voice call to the appropriate domain as UE 110 moves about. VCC AS 138 allows UE 110 to move between CS and PS domains by "calling into" VCC AS 138 and moving the voice call to the new domain.

For simplicity, SGSN 132, GGSN 134, MSC 136, and VCC AS 138 are shown belonging in the same core network 130 in FIG. 1. In general, these network entities may belong in the same network or different networks. For example, VCC AS 138 may belong in a home network for UE 110, and the other network entities may belong in the home network (e.g., if UE 110 is not roaming) or a visited network (e.g., if UE 110 is roaming).

The network entities in UTRAN 120 and core network 130 are described in 3GPP TS 23.002, entitled "Network architecture," March 2006, and in TS 23.206, entitled "Voice Call Continuity (VCC) between Circuit Switched (CS) and IP Multimedia Subsystem (IMS)," March 2007. These documents are publicly available.

UTRAN 120 implements W-CDMA since 3GPP Release 99. 3GPP Release 5 and later support High-Speed Packet Access (HSPA), which includes High-Speed Downlink Packet Access (HSDPA) introduced in 3GPP Release 5 and High-Speed Uplink Packet Access (HSUPA) introduced in 3GPP Release 6. HSDPA is a set of channels and procedures that enable high-speed packet data transmission on the downlink. HSUPA is a set of channels and procedures that enable high-speed packet data transmission on the uplink. HSPA supports PS services such as packet data services, VoIP, etc. A VoIP call is a PS call for voice in which voice data is sent in packets that are routed like other packet data instead of on a dedicated traffic channel.

Figure 2:
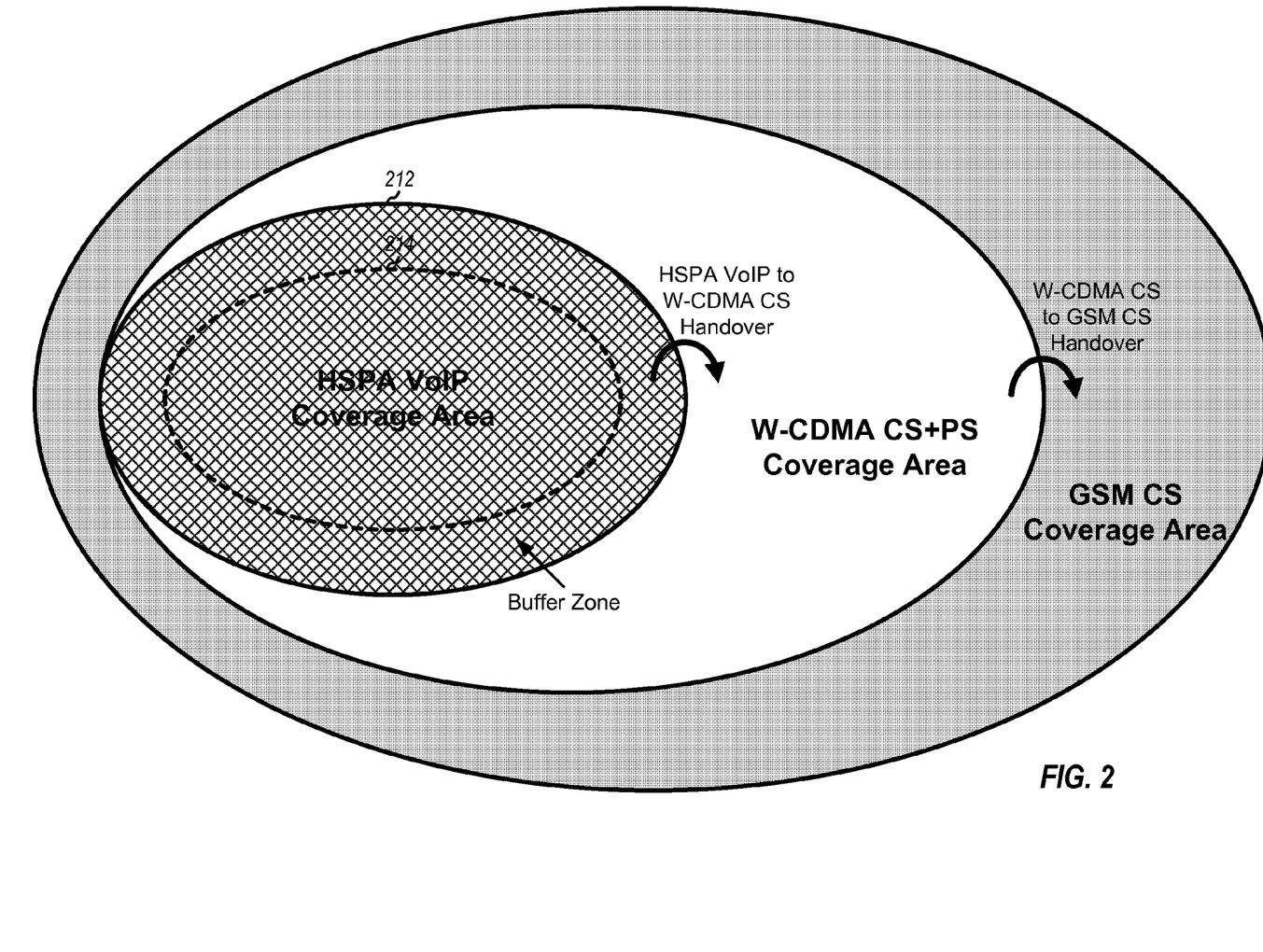
FIG. 2 shows an example deployment scenario for 3GPP.

FIG. 2 shows an example deployment scenario for 3GPP. GSM supports CS services for UEs and may be deployed over a wide geographic area. W-CDMA supports CS and PS services for UEs and may be deployed over a smaller geographic area than GSM. The coverage area for W-CDMA may lie completely within the coverage area for GSM (as shown in FIG. 2) or may overlap partially with the coverage area for GSM (not shown in FIG. 2). HSPA supports PS services (e.g., VoIP) for UEs and may be deployed over a smaller geographic area than W-CDMA. The coverage area for HSPA may be a fraction of the coverage area for W-CDMA.

UE 110 may be located within the HSPA coverage area and may establish a VoIP call with UTRAN 120. The VoIP call may be established via IMS entities using Session Initiation Protocol (SIP), which is a signaling protocol for initiating, modifying, and terminating IP-based interactive user sessions such as VoIP. UTRAN 120 may ascertain that UE 110 has an HSPA VoIP call based on radio access bearers (RABs) established for the voice call, e.g., RABs for conversational traffic class with SIP signaling. In alternative, UTRAN 120 may ascertain that UE 110 has an HSPA VoIP call based on explicit signaling exchanged with the UE or with the core network. UE 110 may exchange voice data packets with UTRAN 120 via HSPA for the VoIP call. UE 110 may be roaming and may move from the HSPA coverage area into either the W-CDMA or GSM coverage area. It is desirable to maintain the voice call for UE 110 in such a situation.

In an aspect, an HSPA VoIP to W-CDMA CS handover may be performed for UE 110 in order to maintain voice call continuity for the UE when moving outside of the HSPA coverage area. In one design of the HSPA VoIP to W-CDMA CS handover, UE 110 may first establish a CS call with the same cell while the VoIP call is pending and may transfer the voice call to the CS call. UE 110 may then perform W-CDMA CS to W-CDMA CS handover or W-CDMA CS to GSM CS handover, as appropriate, in order to maintain the voice call. The HSPA VoIP to W-CDMA CS handover is described below.

Figure 3A:
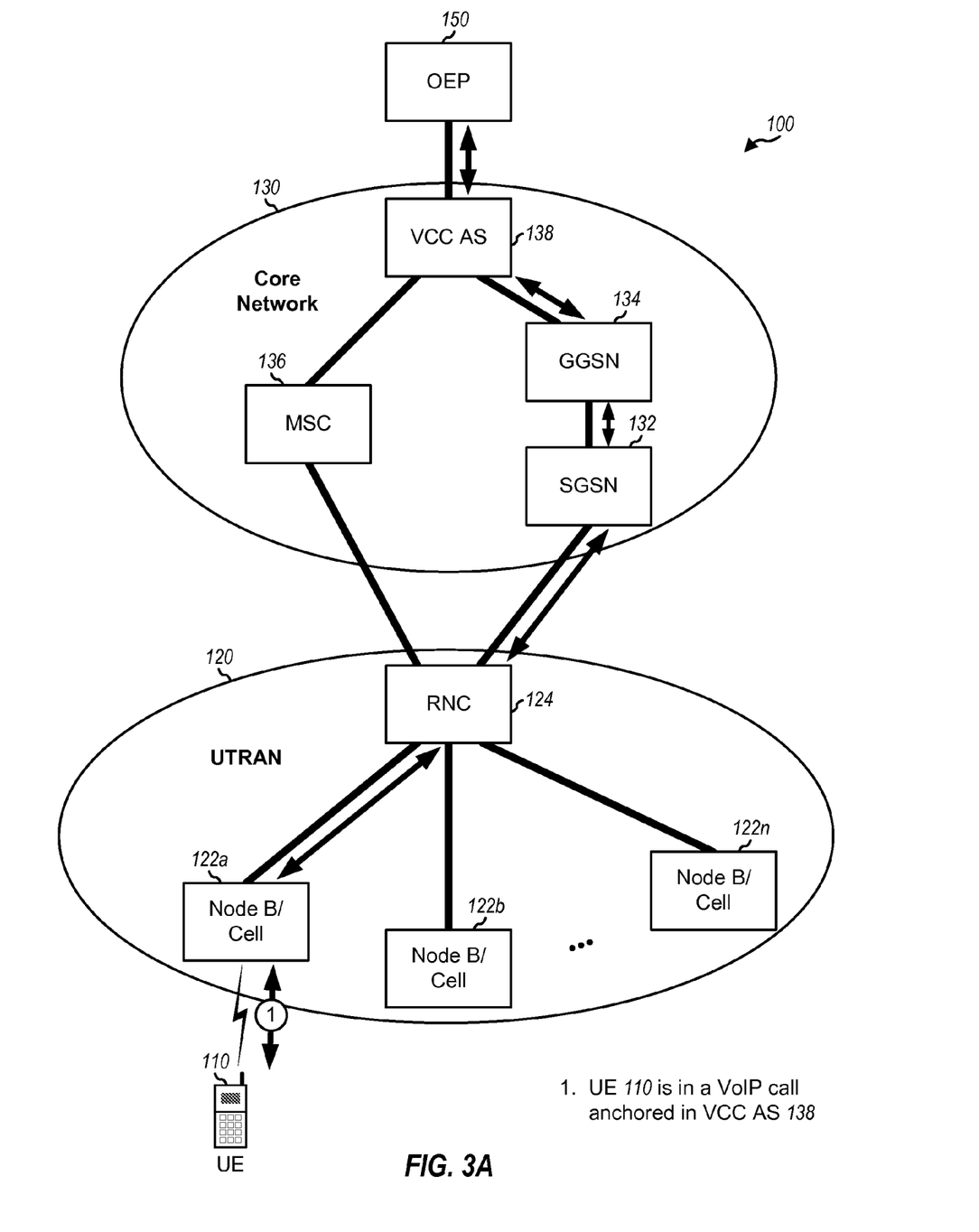
FIGS. 3A to 3E show HSPA VoIP to W-CDMA CS handover for a UE.

FIG. 3A shows communication between UE 110 and various network entities for a VoIP call with a remote terminal 150, which is also referred to as an other end party (EOP). The VoIP call may be anchored in VCC AS 138. UE 110 may exchange voice data packets via serving cell 122a and RNC 124 in UTRAN 120, SGSN 132, GGSN 134, VCC AS 138, and remote terminal 150. Packets may be exchanged between UE 110 and serving cell 122a via HSPA.

Figure 3B:
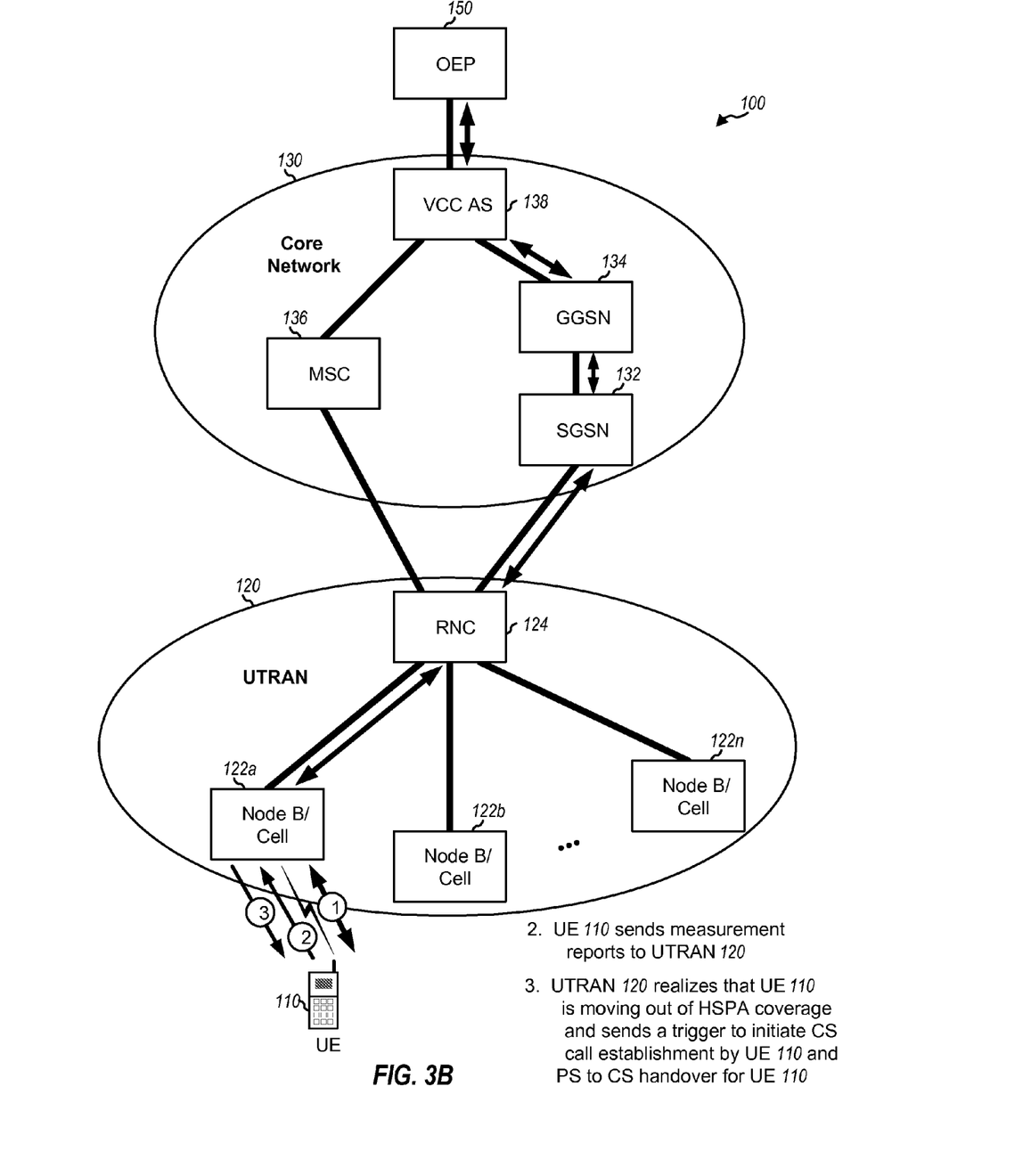

FIG. 3B shows initiation of HSPA VoIP to W-CDMA CS handover for UE 110. While in communication with serving cell 122a in UTRAN 120 for the VoIP call, UE 110 may detect for pilots from other cells and may make measurements of the pilots received from serving cell 122a as well as the other cells. UE 110 may send measurement reports to UTRAN 120, e.g., periodically or when invoked by a reporting event. Alternatively or additionally, UE 110 may send location update messages to UTRAN 120 when appropriate.

UTRAN 120 may receive the measurement reports from UE 110 and determine that the UE is moving out of the HSPA coverage area. For example, the measurement reports may indicate that UE 110 receives the pilot from cell 122b stronger than the pilot from serving cell 122a by a sufficient amount to merit handover from cell 122a to cell 122b. UTRAN 120 may also recognize that cell 122a supports HSPA whereas cell 122b does not support HSPA. UTRAN 120 may then send a trigger to initiate the CS call establishment by UE 110 and the PS to CS handover for UE 110. The trigger may be considered as a command, a VCC HO command, a directive, an indication, etc.

Figure 3C:
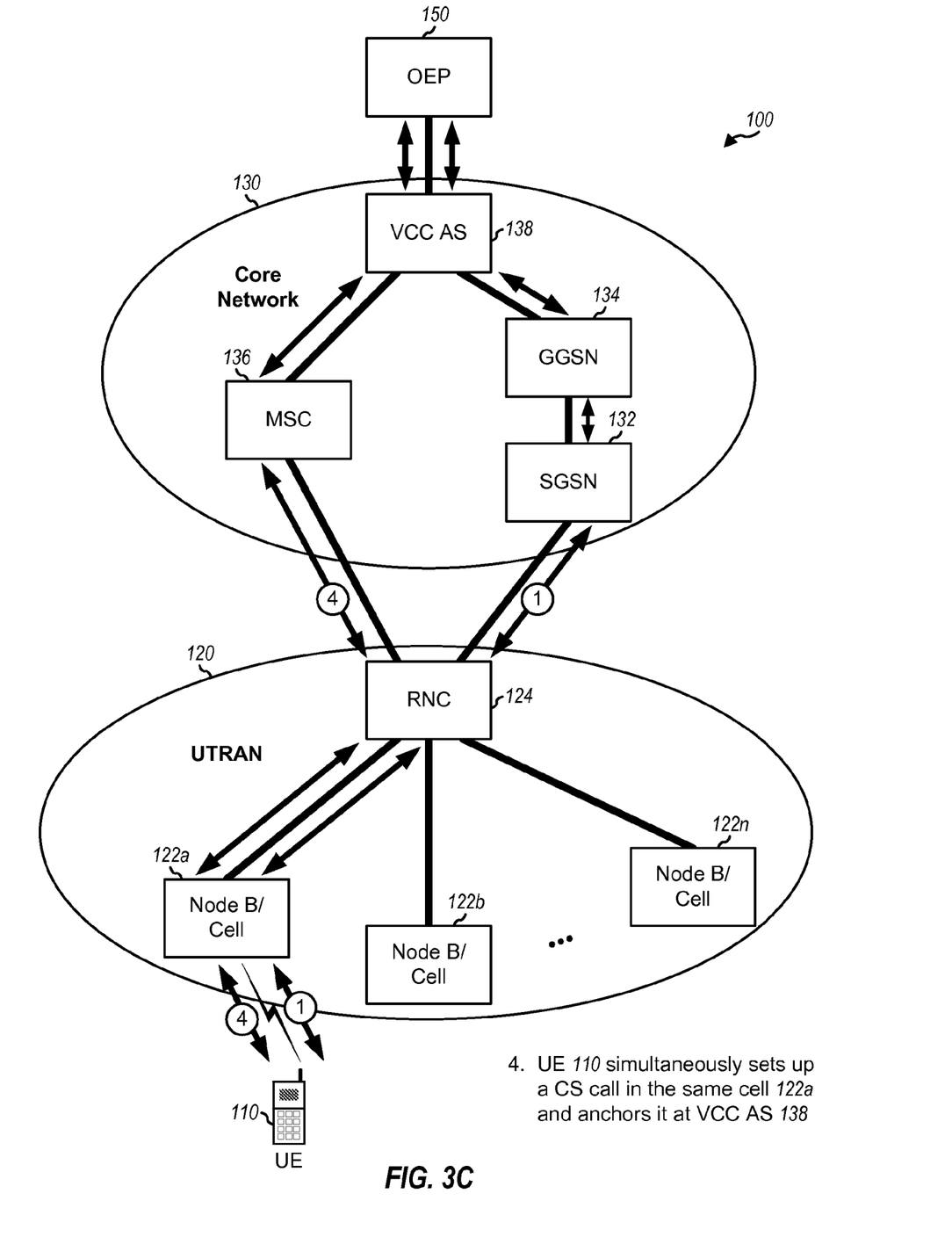

FIG. 3C shows setup of a CS call while a PS session for VoIP is pending for UE 110 at cell 122a. UE 110 may receive the trigger from UTRAN 120. UE 110 may then establish a CS call with cell 122a via MSC 136 in response to the trigger and may anchor this CS call at VCC AS 138. UMTS (or W-CDMA) allows UE 110 to establish the CS call using the same radio link used for the PS session. For a brief moment, UE 110 may simultaneously have both the CS call and the PS call with the same cell 122a and may have both calls anchored at VCC AS 138. Voice data packets for the PS call may be routed through SGSN 132 and GGSN 134 while voice data for the CS call may be routed through MSC 136. VCC AS 138 may recognize that both the CS call and the PS call are for the same voice call for UE 110, e.g., based on the use of the same UE identifier (UE ID) for the CS call and PS call, the same OEP, etc.

Figure 3D:
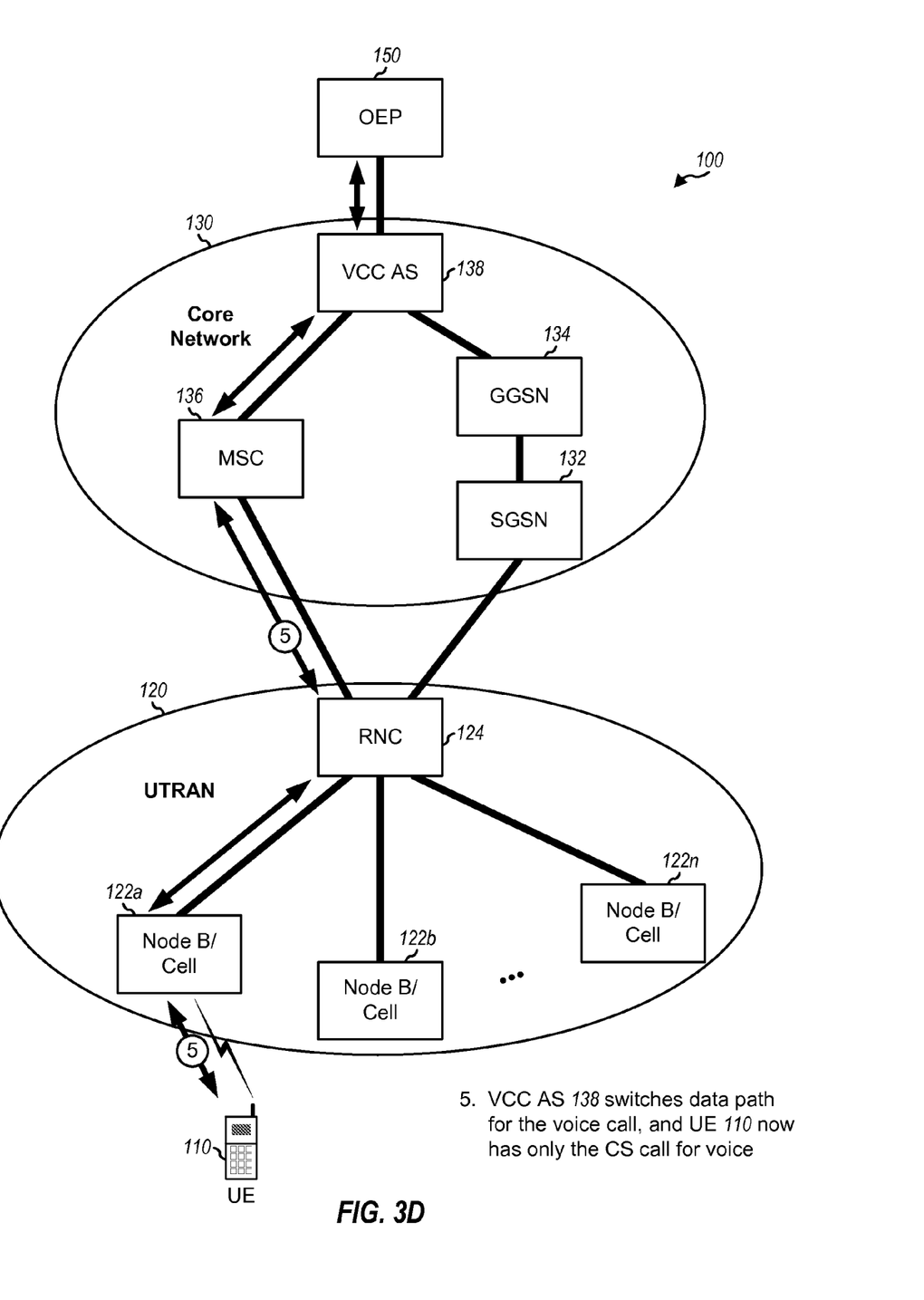

FIG. 3D shows transfer of the voice call for UE 110 from HSPA VoIP to CS. Once the CS call has been successfully established, VCC AS 138 may switch data path for the voice call for UE 110 and may release resources for the PS call in the source side. UTRAN 120 may release radio resources for the PS call and may maintain only the CS call for UE 110. At this point, UE 110 would have only the CS call via the same serving cell 122a. Data for the CS call may be exchanged via UTRAN 120, MSC 136, and VCC AS 138.

Figure 3E:
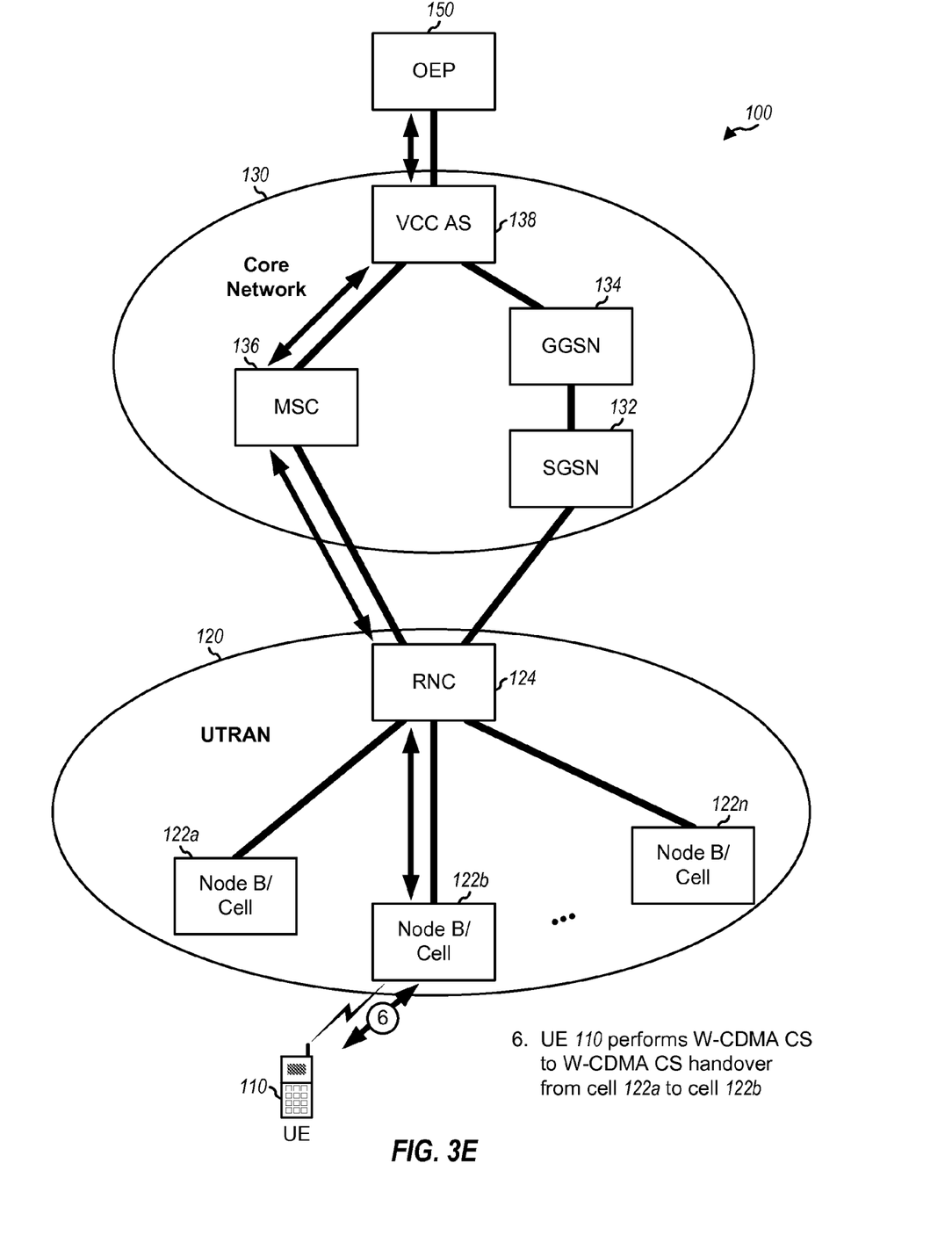

FIG. 3E shows completion of the HSPA VoIP to W-CDMA CS handover. Once UE 110 completes the switch of the voice call to the CS call at cell 122a, UE 110 may perform W-CDMA CS to W-CDMA CS handover from cell 122a to cell 122b, which does not support HSPA. The W-CDMA CS to W-CDMA CS handover is described in 3GPP TS 23.060, entitled "General Packet Radio Service (GPRS); Service description," June 2006, which is publicly available. Although not shown in FIG. 3E, UE 110 may also perform W-CDMA CS to GSM CS handover from cell 122a to a GSM cell using inter-RAT handover procedures defined by 3GPP.

The following handover scenarios may be supported:
HSPA VoIP→W-CDMA CS→W-CDMA CS, and
HSPA VoIP→W-CDMA CS→GSM CS.

In each handover scenario given above, the first transfer HSPA VoIP→W-CDMA CS occurs in the current serving cell. The subsequent handover may be from the current serving cell to another W-CDMA cell or a GSM cell.

The HSPA VoIP to W-CDMA CS handover design shown in FIGS. 3A through 3E may be supported with small impact to network entities in 3GPP. Steps 1, 4, 5 and 6 are supported by current capabilities of UTRAN 120 and VCC AS 138. For step 2, UTRAN 120 may implement a network-controlled handover mechanism with appropriate algorithms to determine whether to initiate HSPA VoIP to W-CDMA CS handover and possibly a new event to initiate this handover. For step 3, a trigger or some other new UTRAN message may be used to initiate CS call establishment in UE 110. The trigger may be implemented with an information element (IE) that may be sent in an existing Radio Resource Control (RRC) message, e.g., a paging message. RRC resides at the link layer (or layer 3) in W-CDMA and is responsible for controlling the configuration of lower layers 1 and 2.

UE 110 may be located within the W-CDMA or GSM coverage area and may establish a CS voice call with UTRAN 120. UE 110 may exchange voice data in the normal manner for the CS call. UE 110 may be roaming and may move into the HSPA coverage area. It may be desirable to continue the voice call for UE 110 using HSPA in such a situation.

In another aspect, a W-CDMA CS to HSPA VoIP handover may be performed for UE 110 in order to take advantage of HSPA for a voice call for the UE. The W-CDMA CS to HSPA VoIP handover may be performed in a manner complementary to the HSPA VoIP to W-CDMA CS handover described in FIGS. 3A through 3E. UE 110 may make measurements for pilots received by the UE and send measurement reports to UTRAN 120. UTRAN 120 may determine that UE 110 has moved into the coverage of a VoIP capable cell based on the measurement reports. UTRAN 120 may send a trigger to initiate handover by UE 110. Upon receiving the trigger, UE 110 may perform handover of the CS call from the current serving cell to the VoIP capable cell, which becomes the new serving cell. The UE may then set up a PS call for VoIP (or VoIP call) with the serving cell and may anchor this VoIP call at VCC AS 138. Once the VoIP call has been successfully established, VCC AS 138 may switch data path for the voice call for UE 110 and may release resources for the CS call in the source side. UTRAN 120 may release radio resources for the CS call and may maintain only the VoIP call for UE 110. At this point, UE 110 would have only the VoIP call via the new serving cell. Data for the VoIP call may be exchanged via the new serving cell in UTRAN 120, SGSN 132, GGSN 134, and VCC AS 138.

In the designs described above, UE 110 may send measurement reports to UTRAN 120, and UTRAN 120 may initiate handover when UE 110 moves out of or into the HSPA coverage area. In these designs, UTRAN 120 may have knowledge of cells with HSPA VoIP capability and cells without HSPA VoIP capability. To assist UTRAN 120 with handover decision, a buffer zone of cells with HSPA VoIP capability may be defined at the edge of the HSPA coverage area. In the example shown in FIG. 2, the HSPA coverage area may be defined by a solid line 212, and the buffer zone may be defined as the area between solid line 212 and a dashed line 214. When UE 110 enters the buffer zone, UTRAN 120 may configure a new measurement event in UE 110. UE 110 may periodically send measurement reports to UTRAN 120 or based on events. UTRAN 120 may use the measurement reports to initiate either (1) HSPA VoIP to W-CDMA CS handover if UE 110 has a VoIP call and is leaving the HSPA coverage area or (2) W-CDMA CS to HSPA VoIP handover if UE 110 has a CS call and is entering the HSPA coverage area.

In another design, UE 110 may make measurements and autonomously decide handover from HSPA VoIP to W-CDMA CS or from W-CDMA CS to HSPA VoIP based on the measurements. UE 110 may ascertain whether a given cell has HSPA VoIP capability based on information broadcast by the cell, as described below.

UE 110 may operate in a connected mode or an idle mode at any given moment. In the connected mode, UE 110 may have a pending call and may communicate with UTRAN 120. While in the connected mode, the whereabouts of UE 110 may be tracked via measurement reports and/or other mechanisms, and UE 110 may be handed over to appropriate cells based on the UE location.

In the idle mode, UE 110 typically does not have a pending call with UTRAN 120. While in the idle mode, UE 110 may be powered down much of the time to conserve battery power and may wake up periodically to receive pages and/or other information. UE 110 may register with VCC AS 138 for IMS (e.g., at power up) and may provide the domain (e.g., CS, PS, HSPA VoIP, etc.) via which pages and calls can be delivered to the UE.

In yet another aspect, cells in UTRAN 120 broadcast their HSPA VoIP capability. In one design, a single bit may be used to indicate whether or not a given cell supports HSPA VoIP. For W-CDMA, a cell may periodically broadcast information regarding its HSPA VoIP capability in a system information block (SIB), e.g., SIB3 and/or some other SIB in 3GPP.

UE 110 may receive broadcast information regarding the HSPA VoIP capability of a cell on which the UE is currently camped and/or other cells. UE 110 may determine whether its domain has changed based on the received broadcast information and may update its network registration whenever a change in domain is detected. For example, UE 110 may determine that it has moved out of the HSPA coverage area based on the broadcast information and may update its network registration from HSPA VoIP domain to CS domain. By updating the network registration as needed, the network can ascertain whether idle UE 110 is in the HSPA coverage area and can appropriately deliver pages and calls to the UE.

For clarity, the handover techniques have been specifically described for 3GPP-based networks. The techniques may also be used for 3GPP2-based networks and other networks. A 3GPP2-based network may include cells that support High Rate Packet Data (HRPD) and cells that support CDMA2000 1X. HRPD is also referred to as 1xEV-DO, 1x-DO, etc. CDMA2000 1X is also referred to as 1X, etc. The HRPD cells support VoIP, and the 1X cells support CS and PS calls. HRPD to 1X handover may be performed in an analogous manner to the HSPA VoIP to W-CDMA CS handover described above. 1X to HRPD handover may be performed in an analogous manner to the W-CDMA CS to HSPA VoIP handover described above.

Figure 4:
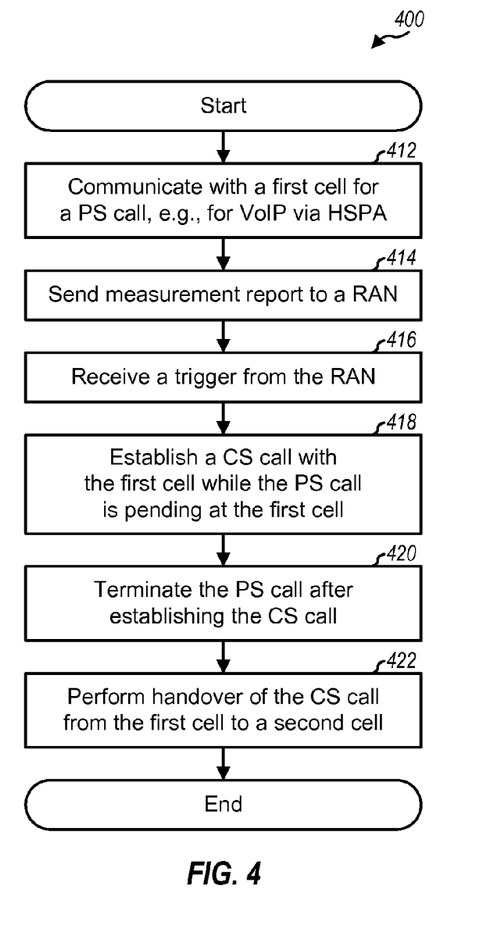
FIG. 4 shows a process for performing PS-to-CS handover by a UE.

FIG. 4 shows a design of a process 400 for performing PS-to-CS handover by a UE. The UE may communicate with a first cell for a PS call, e.g., for VoIP via HSPA in 3GPP (block 412). The UE may send measurement reports to a RAN, e.g., in response to a measurement event from the RAN (block 414). The UE may receive a trigger from the RAN, which may issue this trigger based on the measurement reports from the UE (block 416). Alternatively, the UE may obtain measurements for the first cell and other cells in the RAN and may autonomously decide to perform handover based on the measurements.

The UE may establish a CS call with the first cell while the PS call is pending at the first cell (block 418). The UE may terminate the PS call after establishing the CS call (block 420). The PS call and the CS call may be for a voice call, and the UE may switch data path for the voice call from the PS call to the CS call after establishing the CS call and prior to terminating the PS call. The UE may then perform handover of the CS call from the first cell to a second cell (block 422). The first cell may be a W-CDMA cell that supports VoIP, and the second cell may be another W-CDMA cell or a GSM cell that does not support VoIP.

Figure 5:
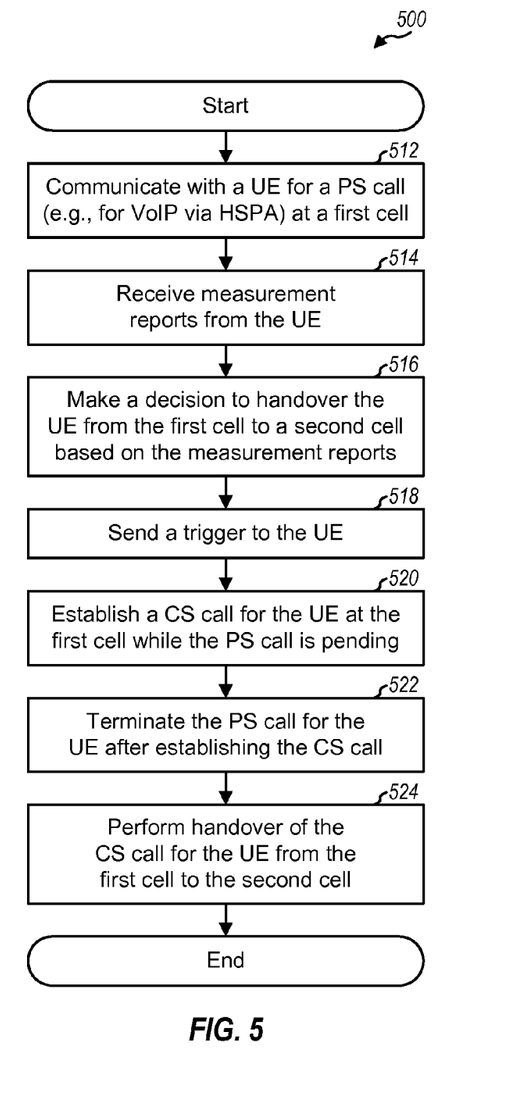
FIG. 5 shows a process for performing PS-to-CS handover of a UE by a RAN.

FIG. 5 shows a design of a process 500 for performing PS-to-CS handover of a UE by a RAN. The RAN may communicate with the UE for a PS call (e.g., for VoIP via HSPA) at a first cell (block 512). The RAN may determine that the UE is at coverage edge for the PS call and may send a measurement event to the UE to invoke the UE to send measurement reports. The RAN may receive measurement reports from the UE (block 514), make a decision to handover the UE from the first cell to a second cell based on the measurement reports (block 516), and send a trigger to the UE (block 518).

The RAN may establish a CS call for the UE at the first cell while the PS call is pending at the first cell (block 520). The RAN may terminate the PS call for the UE after establishing the CS call (block 522). The PS call and the CS call may be for a voice call, and the data path for the voice call may be switched from the PS call to the CS call after establishing the CS call and prior to terminating the PS call. The RAN may then perform handover of the CS call for the UE from the first cell to the second cell (block 524). The first cell may support VoIP, and the second cell may not support VoIP.

Some or all of the steps in FIG. 5 may be applicable to a given network entity in the RAN. For example, the first cell may perform steps 512, 520, 522, 524, etc. An RNC may perform steps 514, 516, 518, etc.

Figure 6:
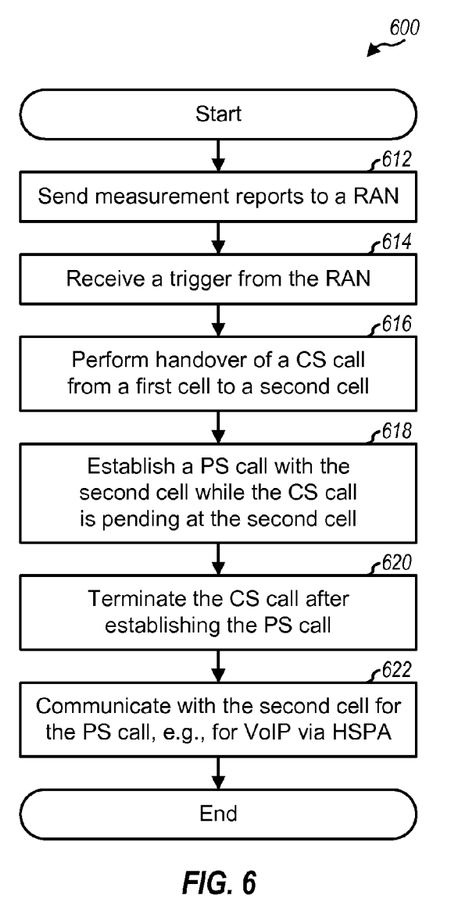
FIG. 6 shows a process for performing CS-to-PS handover by a UE.

FIG. 6 shows a design of a process 600 for performing CS-to-PS handover by a UE. The UE may send measurement reports to a RAN (block 612) and may receive a trigger from the RAN (block 614). The UE may perform handover of a CS call from a first cell to a second cell (block 616). The UE may then establish a PS call with the second cell while the CS call is pending at the second cell (block 618). The UE may terminate the CS call after establishing the PS call (block 620) and may communicate with the second cell for the PS call, e.g., for VoIP via HSPA (block 622).

Figure 7:
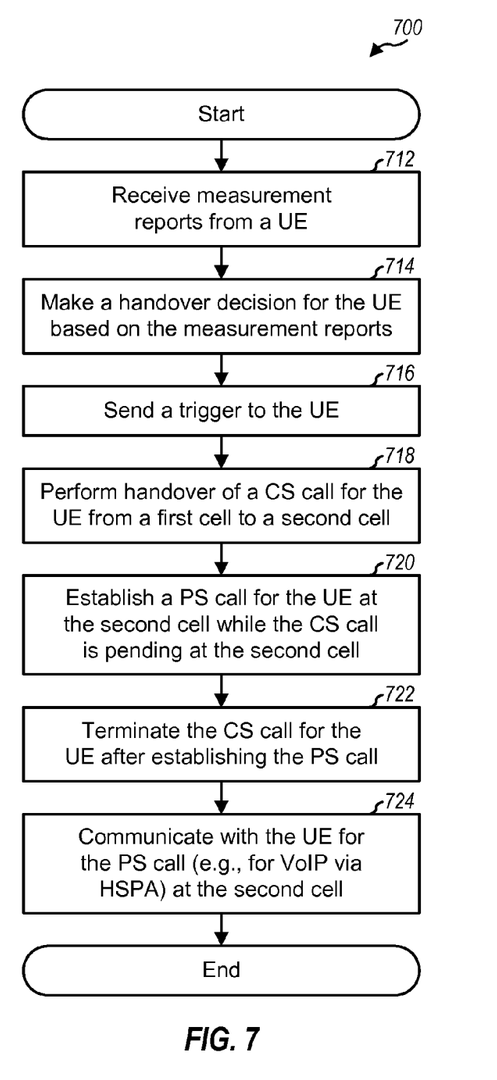
FIG. 7 shows a process for performing CS-to-PS handover of a UE by a RAN.

FIG. 7 shows a design of a process 700 for performing CS-to-PS handover of a UE by a RAN. The RAN may determine that the UE is moving into PS coverage and may send a measurement event to the UE to invoke the UE to send measurement reports. The RAN may receive measurement reports from the UE (block 712), make a handover decision for the UE based on the measurement reports (block 714), and send a trigger to the UE (block 716).

The RAN may perform handover of a CS call for the UE from a first cell to a second cell (block 718). The RAN may then establish a PS call for the UE at the second cell while the CS call is pending at the second cell (step 720). The RAN may terminate the CS call for the UE after establishing the PS call (block 722). The RAN may thereafter communicate with the UE for the PS call (e.g., for VoIP via HSPA) at the second cell (block 724).

Figure 8:
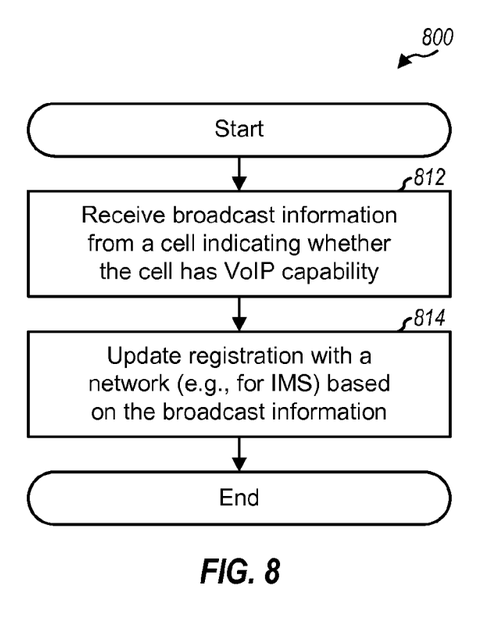
FIG. 8 shows a process for updating network registration by a UE.

FIG. 8 shows a design of a process 800 for updating network registration by a UE. The UE (e.g., while in an idle mode) may receive broadcast information from a cell indicating whether the cell has VoIP capability (block 812). The broadcast information may comprise a bit indicating whether or not the cell has HSPA VoIP capability or may comprise other information. The UE may update registration with a network based on the broadcast information (block 814). For block 814, the UE may determine a domain to use for a new call based on the broadcast information and may update registration with the network if a change in domain is detected. For example, the UE may register with the network for PS domain if the cell has VoIP capability and may register with the network for CS domain if the cell does not have VoIP capability.

FIG. 9 shows a block diagram of a design of UE 110 and various network entities in FIG. 1. On the uplink, UE 110 may transmit data and signaling (e.g., measurement reports) to one or more cells/Node Bs 122 in UTRAN 120. The data and signaling may be processed by a controller/processor 910 and conditioned by a transmitter (TMTR) 914 to generate an uplink signal, which may be transmitted to the Node Bs. At each Node B 122, the uplink signals from UE 110 and other UEs may be received and conditioned by a receiver (RCVR) 924 and further processed by a controller/processor 920 to recover the uplink data and signaling sent by the UEs.

On the downlink, each Node B 122 may transmit data and signaling to the UEs within its coverage area. At each Node B 122, the data and signaling (e.g., trigger, VoIP capability information, etc.) may be processed by processor 920 and conditioned by transmitter 924 to generate a downlink signal, which may be transmitted to the UEs. At UE 110, the downlink signals from Node Bs 122 may be received and conditioned by receiver 914 and further processed by processor 910 to recover the downlink data and signaling.

Memories 912 and 922 may store program codes and data for UE 110 and Node B 122, respectively. A communication (Comm) unit 926 allows Node B 122 to communicate with RNC 124. Processor 910 at UE 110 may perform process 400 in FIG. 4, process 600 in FIG. 6, and/or other processes for handover. Processor 910 may also perform process 800 in FIG. 8 and/or other processes for updating network registration.

RNC 124 includes a controller/processor 930, a memory 932, and a Comm unit 934. VCC AS 138 includes a controller/processor 940, a memory 942, and a Comm unit 944. For each network entity, the controller/processor may perform pertinent processing for that network entity, the memory may store program codes and data, and the communication unit may support communication with other network entities. Processor 920 at Node B 122 and/or processor 930 at RNC 124 may perform process 500 in FIG. 5, process 700 in FIG. 7, and/or other processes for handover.

In general, each entity may include any number of processors, memories, communication units, transmitters, receivers, controllers, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for wireless communication, the apparatus comprising:
   at least one processor configured to:
   communicate, a first call, from user equipment (UE) to second user equipment via a first cell, wherein the first call is one of a packet-switched (PS) call and a circuit switched call (CS);
   detect a triggering event to perform a PS-to-CS or CS-to-PS call handover;
   establish a second call from the UE to the second user equipment via the first cell in response to the triggering event while the first call is in progress at the first cell, wherein the second call is the PS call when the first call is the CS call, and wherein the second call is the CS call when the first call is the PS call;
   terminate the first call after establishing the second call; and
   perform a handover of the second call from the first cell to a second cell.

2. The apparatus of claim 1, wherein the PS call and the CS call are for a voice call, and wherein the at least one processor switches a data path for the voice call from the PS call to the CS call after establishing the CS call.

3. The apparatus of claim 1, wherein the PS call is for Voice-over-Internet Protocol (VoIP), and wherein the first cell supports VoIP and the second cell does not support VoIP.

4. The apparatus of claim 1, wherein the at least one processor is incorporated into the UE that sends measurement reports to a radio access network (RAN), and wherein detecting the triggering event includes receiving a trigger from the RAN based on the measurement reports.

5. The apparatus of claim 4, wherein the at least one processor receives a measurement event from the RAN and sends the measurement reports in response to the measurement event.

6. The apparatus of claim 4, wherein the measurement reports sent to the RAN indicate a desired high speed packet access (HSPA) Voice-over-Internet Protocol (VoIP) to wideband code division multiple access (W-CDMA) handover in response to the first call being a VoIP call and the at least one processor leaving a HSPA coverage area.

7. The apparatus of claim 1, wherein the at least one processor detects the triggering event by obtaining measurements for the first cell and neighbor cells and determines to perform the handover based on the measurements.

8. The apparatus of claim 1, wherein the at least one processor communicates with the first cell via High-Speed Packet Access (HSPA) for the PS call.

9. The apparatus of claim 1, wherein the at least one processor communicates with the first cell via High Rate Packet Data (HRPD) for the PS call.

10. The apparatus of claim 1, wherein the first cell is a wideband code division multiple access cell (W-CDMA cell) and the second cell is another W-CDMA cell or a global system for mobile communications (GSM) cell.

11. The apparatus of claim 1, wherein the at least one processor is further configured to receive broadcast information from the first cell indicating whether the first cell has Voice-over-Internet Protocol (VoIP) capability and to update registration with a network based on the broadcast information.

12. The apparatus of claim 11, wherein the at least one processor is further configured to receive the broadcast information while in an idle mode.

13. The apparatus of claim 1, wherein the at least one processor is integrated into the UE that has knowledge of cells with high speed packet access (HSPA) Voice-over-Internet Protocol (VoIP) and of cells without HSPA VoIP capability.

14. The apparatus of claim 1, wherein the at least one processor is further configured to simultaneously communicate first data of the first call to the destination via a first path and second data of the second call to the destination via a second path, wherein the first path is different from the second path.

15. A method for wireless communication, the method comprising:
communicating, a first call, from user equipment (UE) to second user equipment via a first cell, wherein the first call is one of a packet-switched (PS) call and a circuit-switched (CS) call;
detecting a triggering event to perform a PS-to-CS or CS-to-PS handover;
establishing a second call from the UE to the second user equipment via the first cell in response to the triggering event while the first call is in progress at the first cell, wherein the second call is the PS call when the first call is the CS call, and wherein the second call is the CS call when the first call is the PS call;
terminating the first call after establishing the second call; and
performing a handover of the second call from the first cell to a second cell.

16. The method of claim 15, further comprising sending measurement reports to a radio access network (RAN), wherein detecting the triggering event includes receiving a trigger from the RAN, and wherein the trigger from the RAN is based on the measurement reports.

17. The method of claim 15, wherein the communicating with the first cell for the PS call comprises communicating with the first cell via High-Speed Packet Access (HSPA) for the PS call.

18. An apparatus for wireless communication, the apparatus comprising:
means for communicating a first call from user equipment (UE) to second user equipment via a first cell, wherein the first call is one of a packet-switched (PS) call and a circuit-switched (CS) call;
means for detecting a triggering event to perform a PS-to-CS or CS-to-PS handover;
means for establishing a second call from the UE to the second user equipment via the first cell in response to the triggering event while the first call is in progress at the first cell, wherein the second call is the PS call when the first call is the CS call, and wherein the second call is the CS call when the first call is the PS call;
means for terminating the first call after establishing the second call; and
means for performing a handover of the second call from the first cell to a second cell.

19. The apparatus of claim 18, further comprising:
means for sending measurement reports to a radio access network (RAN), and
wherein the triggering event includes receiving a trigger from the RAN and wherein the trigger is based on the measurement reports.

20. The apparatus of claim 18, wherein the means for communicating with the first cell for the first call comprises means for communicating with the first cell via High-Speed Packet Access (HSPA) for the PS call.

21. A non-transitory processor-readable medium for storing instructions, when executed by a processor, cause the processor to:
communicate, a first call, from user equipment (UE) to second user equipment via a first cell, wherein the first call is one of a packet-switched (PS) call and a circuit-switched (CS) call;
detect a triggering event to perform PS-to-CS or CS-to-PS call handover;
establish a second call from the UE to the second user equipment via the first cell in response to the triggering event while the first call is in progress at the first cell, wherein the second call is the PS call when the first call is the CS call, and wherein the second call is the CS call when the first call is the PS call;
terminate the first call after establishing the second call; and
perform a handover of the second call from the first cell to a second cell.

22. An apparatus for wireless communication, the apparatus comprising:
at least one processor configured to:
communicate, a first call, from user equipment (UE) to second user equipment via a first cell, wherein the first call is one of a packet-switched (PS) call and a circuit-switched (CS) call;
initiate a triggering event to perform a PS-to-CS or CS-to-PS call handover;
establish a second call from the UE to the second user equipment via the first cell while the first call is in progress at the first cell, wherein the second call is the PS call when the first call is the CS call, and wherein the second call is the CS call when the first call is the PS call;
terminate the first call for the UE after establishing the second call; and
perform a handover of the second call for the UE from the first cell to a second cell.

23. The apparatus of claim 22, wherein the PS call and the CS call are for a voice call, and wherein the at least one processor switches a data path for the voice call from the PS call to the CS call after establishing the CS call.

24. The apparatus of claim 22, wherein the PS call is for Voice-over-Internet Protocol (VoIP), and wherein the first cell supports VoIP and the second cell does not support VoIP.

25. The apparatus of claim 22, wherein the at least one processor receives measurement reports from the UE, determines to perform the handover from the first cell to the second cell based on the measurement reports, and sends a trigger to the UE in response to the determination.

26. The apparatus of claim 25, wherein the at least one processor determines that the UE is at a coverage edge for the PS call, and sends a measurement event to the UE to cause the UE to send the measurement reports.

27. The apparatus of claim 22, wherein the at least one processor communicates with the UE via High-Speed Packet Access (HSPA) for the PS call.

28. The apparatus of claim 22, wherein the at least one processor broadcasts information indicating that the first cell has High-Speed Packet Access (HSPA) Voice-over-Internet Protocol (VoIP) capability.

29. A method for wireless communication, the method comprising:
communicating, a first call, from user equipment (UE) to second user equipment via a first cell, wherein the first call is one of a packet-switched (PS) call and a circuit-switched (CS) call;
initiating a triggering event to perform a PS-to-CS or CS-to-PS call handover;
establishing a second call from the UE to the second user equipment via the first cell while the first call is in progress at the first cell, wherein the second call is the PS call when the first call is the CS call, and wherein the second call is the CS call when the first call is the PS call;
terminating the first call for the UE after establishing the second call; and
performing a handover of the second call for the UE from the first cell to a second cell.

30. The method of claim 29, further comprising:
receiving measurement reports from the UE; and
determining to perform the handover from the first cell to the second cell based on the measurement reports, and wherein a trigger is sent to the UE in response to the decision.

31. The method of claim 29, wherein the communicating with the UE for the first call comprises communicating with the UE via High-Speed Packet Access (HSPA) for the PS call.

32. The method of claim 29, further comprising:
broadcasting information indicating that the first cell has High-Speed Packet Access (HSPA) Voice-over-Internet Protocol (VoIP) capability.

* * * * *